Jan. 16, 1962   J. E. FRIANT ET AL   3,017,120
WINDSHIELD WASHER NOZZLE
Filed June 29, 1959   2 Sheets-Sheet 1

INVENTORS
JAMES E. FRIANT
ROBERT L. MCWILLIAMS
GEORGE P. RANSOM
BY W. E. Finckem
THEIR ATTORNEY

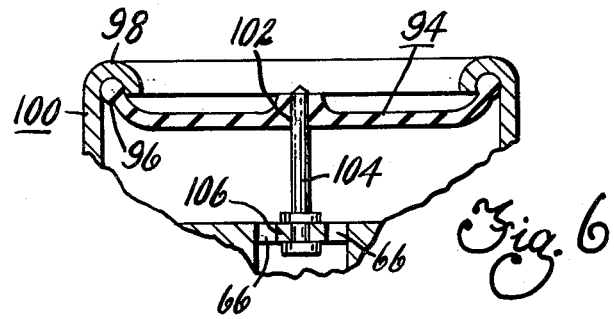
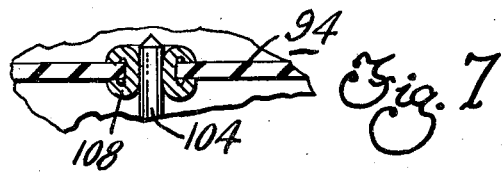
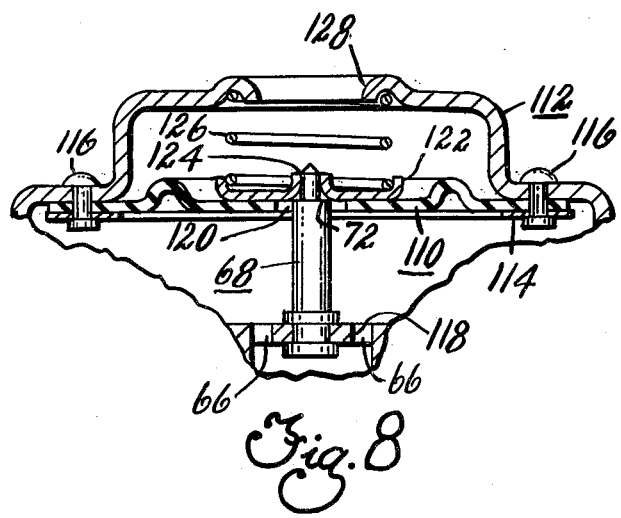

United States Patent Office 3,017,120
Patented Jan. 16, 1962

3,017,120
WINDSHIELD WASHER NOZZLE
James E. Friant, Warren, Robert L. McWilliams, Lakeville, and George P. Ransom, Berkley, Mich., assignors to General Motors Corporation, Detroit, Mich., a corporation of Delaware
Filed June 29, 1959, Ser. No. 823,741
2 Claims. (Cl. 239—117)

This invention pertains to the art of windshield cleaning, and particularly to self-cleaning windshield washer nozzle assemblies.

At the present time numerous motor vehicles are equipped with windshield washers comprising a liquid reservoir, a pump, and a pair of nozzles for directing a jet of liquid solvent onto the windshield in the path of the wiper blades movable thereacross for assisting in the removal of dirt and other vision obscuring material which is deposited on the outer surface of the windshield. The nozzles are usually mounted on the vehicle cowl adjacent the lower rail of the windshield, and thus are subject to becoming clogged due to external foreign material. In addition, the liquid solvent may contain small particles of foreign material which can clog the spray orifices of the nozzles. The present invention relates to self-cleaning nozzle assemblies including means for preventing and/or removing externally and/or internally originating foreign material so as to prevent clogging of the spray orifices in the nozzles. Accordingly, among our objects are the provision of a windshield washer nozzle including a spray orifice member movable under the urge of hydrostatic pressure; the further provision of a windshield washer nozzle including means for substantially enclosing the spray orifice thereof when liquid solvent is not being delivered therethrough; and the still further provision of a windshield washer nozzle including means for automatically cleaning the spray orifice thereof prior to delivering liquid solvent therethrough.

The aforementioned and other objects are accomplished in the present invention by embodying the nozzle within a housing, the nozzle and housing being adapted for relative movement under the urge of hydrostatic pressure. Specifically, five embodiments of an improved washer nozzle assembly are disclosed herein. In the first embodiment the nozzle comprises a housing, or shroud, within which a nozzle member in the form of a piston is mounted for reciprocable movement. The nozzle member includes a rod portion having a spray orifice therein which is aligned with an opening in the housing. The housing is attached to a fitting communicating with a delivery conduit of the washer pump. The nozzle member is normally maintained in a retracted position by a spring so as to be enclosed within the housing. Thus, the spray orifice of the nozzle is protected from externally originating foreign material which may accumulate in the opening of the housing. When the housing is subjected to hydrostatic pressure, the nozzle member moves to an extended position due to the restricted spray orifice, and during extension of the nozzle member any accumulated foreign matter is removed from the opening in the housing.

In the second embodiment the nozzle is in the form of a piston having a spray orifice therein which, in the retracted position is closed by a stationary needle valve which extends therethrough. When the housing is subjected to hydrostatic pressure the nozzle member is moved to an extended position relative to the housing whereupon the needle valve is removed from the spray orifice so as to automatically remove both internally and externally originating foreign material. In this embodiment, the open end of the housing is closed by an annular flexible diaphragm, the outer periphery of which is attached to the housing and the inner periphery of which is attached to the nozzle member.

In the third embodiment the nozzle comprises a housing containing a movable nozzle member having a spray orifice that is normally closed by a stationary needle valve. However, instead of enclosing the open end of the housing with a diaphragm, the nozzle member is formed with integral scrapers which coact with the inner surfaces of the housing to remove any foreign material that may accumulate thereon which would prevent relative movement between the nozzle member and the housing.

In the fourth embodiment the nozzle member is in the form of an inherently resilient diaphragm having a molded spray orifice which is normally closed by a stationary needle valve. This embodiment eliminates the return spring of the other embodiments since the diaphragm has a natural recovery characteristic which causes it to return to its normal position within the housing when the hydrostatic pressure is relieved. In a modification of the fourth embodiment, the spray orifice may be formed by a metal eyelet rather than a molded orifice as aforedescribed.

In a fifth embodiment the nozzle member comprises a diaphragm which is totally enclosed within the housing and has a backing plate within which the spray orifice is formed. The spray orifice is normally closed by a stationary needle valve, and the diaphragm is spring biased to a normal position wherein the spray orifice is closed by the needle valve.

Further objects and advantages of the present invention will be apparent from the following description, reference being had to the accompanying drawings, wherein preferred embodiments of the present invention are clearly shown, and wherein similar reference numerals depict similar parts throughout the several views.

In the drawings:

FIGURE 6 is an enlarged fragmentary sectional view of a nozzle constructed according to the fourth embodiment of the present invention in the rest position.

FIGURE 7 is an enlarged fragmentary sectional view of a modification of the nozzle shown in FIGURE 6.

FIGURE 8 is an enlarged fragmentary sectional view of a nozzle assembly constructed according to the fifth embodiment of this invention in the rest position.

Figure 1:
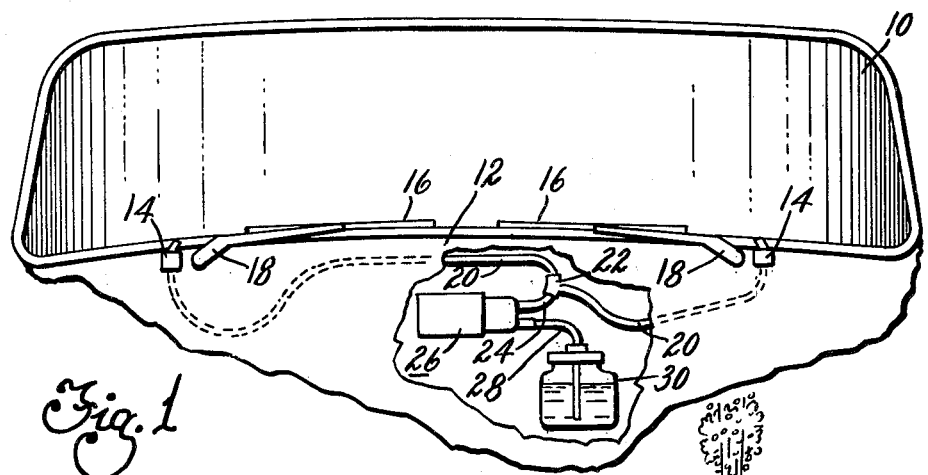
FIGURE 1 is a fragmentary view in elevation of a portion of a motor vehicle, with certain parts broken away depicting a windshield cleaning system embodying a washer nozzle constructed according to the present invention.

With particular reference to FIGURE 1, a portion of a vehicle is shown including a windshield 10 and a cowl 12. A pair of windshield washer nozzles 14 are mounted on the cowl, the washer nozzles having tiny spray orifices for directing a jet of liquid solvent onto the windshield in the paths of the wiper blades 16 which are oscillatible thereacross. The wiper blades 16 are carried by arms 18 and have imparted thereto asymmetric oscillation by any suitable drive means, not shown, as is well known in the art. The nozzles 14 are connected to delivery conduits 20 that connect with a T-fitting 22. The inlet of the T-fitting 22 is connected by a conduit 24 with the outlet of a washer pump 26. The washer pump includes an inlet connected by a conduit 28 to a reservoir 30 containing liquid solvent. The washer pump may be of any type well known in the art having an intake stroke and a delivery stroke such that during the intake stroke a predetermined quantity of liquid solvent is withdrawn from the reservoir 30, and during a delivery stroke this predetermined quantity of liquid solvent is delivered under pressure through conduits 20 to the washer nozzles 14.

Figure 2:
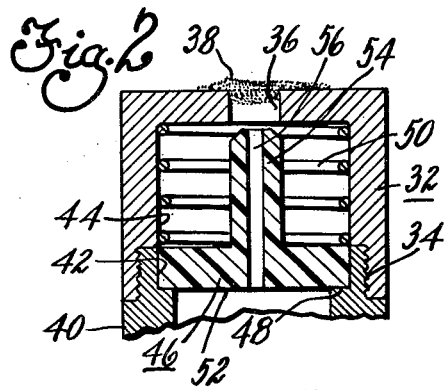
FIGURE 2 is an enlarged fragmentary sectional view of a nozzle constructed according to the first embodiment of the present invention in the rest position.
Figure 3:
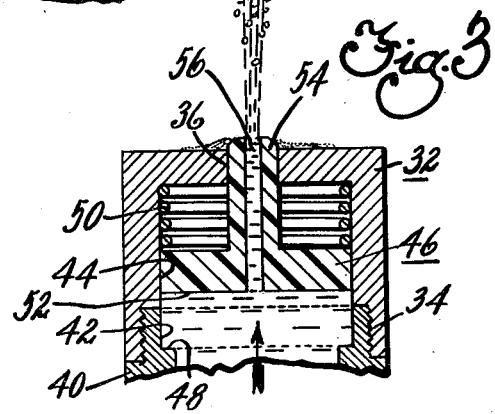
FIGURE 3 is a view similar to FIGURE 2 showing operation of the nozzle in directing liquid solvent onto the windshield.

With particular reference to FIGURES 2 and 3, and as alluded to hereinbefore, it is well recognized that exposed spray orifices often become clogged by small particles of foreign material. According to the present invention, the tiny spray orifices in the nozzles are substantially enclosed when liquid solvent is not being delivered therethrough so that foreign material cannot accumulate therein. As shown in FIGURES 2 and 3, each nozzle 14 comprises an inverted cup-shape metallic housing 32 having an internally threaded portion 34 and a centrally located circular opening 36 in the top thereof. Numeral 38 indicates foreign material which may accumulate on the nozzle housing 32 and block the opening 36. The housing 32 is threadedly connected to a metallic fitting 40 that communicates with the delivery conduit 20. The fitting 40 is suitably attached to the cowl 12 of the vehicle. The fitting 40 and the housing 32 are formed with coaxial bores 42 and 44, respectively, of the same diameter constituting cylinder walls within which a plastic reciprocable nozzle member 46, in the form of a piston, is disposed. The fitting 40 is formed with an internal shoulder 48 which limits downward, or retracting, movement of the nozzle member 46 under the urge of a compression spring 50. The nozzle member 46 is formed with a piston surface 52 and an axially extending rod 54 having a spray orifice 56 therein. The rod 54 is of slightly smaller diameter than the opening 36 and is aligned therewith.

When the washer pump 26 is inactive, the hydrostatic pressure in the delivery conduit 20 and the fitting 40 is relieved. However, upon operation of the washer pump 26, and more particularly, during the delivery stroke of the pump 26, liquid solvent is forced through the conduits 20 and into the fittings 40 under pressure. This hydrostatic pressure acts on the piston surface 52 thereby extending the nozzle member 46 to the position shown in FIGURE 3. The hydrostatic pressure is capable of moving the nozzle member 46 against the urge of spring 50 since the spray orifice 56 is quite restricted. When the nozzle member 46 is in the extended position, as indicated in FIGURE 3, liquid solvent is directed onto the windshield 10 in the paths of the movable wiper blades 16. Moreover, during extending movement of the nozzle member 46, any foreign material which has accumulated in the opening 36 is removed. When the hydrostatic pressure in the housing 32 and the fitting 40 is relieved, upon completion of the delivery stroke of the washer pump 26, the spring 50 moves the nozzle member 45 to the retracted position shown in FIGURE 2.

Figure 4:
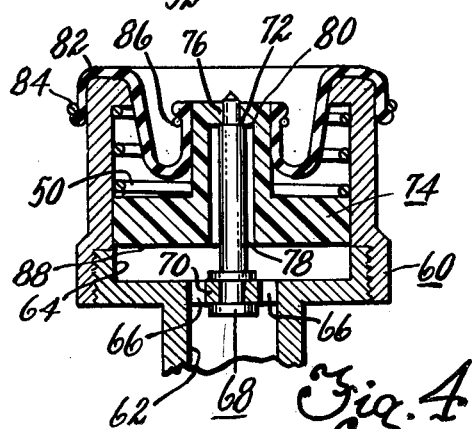
FIGURE 4 is an enlarged fragmentary sectional view of a nozzle constructed according to the second embodiment of this invention in the rest position.

With reference to FIGURE 4, in the second embodiment, the washer nozzle includes a two-part metallic housing 60, the lower part being connected to the delivery conduit 20. The housing 60 is formed with coaxial bores 62 and 64 of different diameters. The bores 62 and 64 are connected by a plurality of passages 66 in the transverse web 70 therebetween. A stationary upstanding needle valve 68 is attached to the web 70, the needle valve having an external shoulder 72. A reciprocable nozzle member 74 composed of any suitable plastic is disposed within the larger diameter bore 64 of the housing 60. The nozzle member 74 is formed with a spray orifice 76 that communicates with a coaxial bore 78. The needle valve 68 is coaxial with the bore 78 in the nozzle member, and the upper end thereof normally protrudes through the spray orifice 76 so as to close the same when the washer pump 26 is inactive. The retracted position of the nozzle member 74 is determined by engagement between the internal shoulder 80 on the nozzle member and the external shoulder 72 on the needle valve, and the nozzle member 74 is normally maintained in the retracted position by the return spring 50.

The open end of the housing 60 is enclosed by an annular flexible elastomeric diaphragm 82. The outer edge of the diaphragm 82 is retained in assembled relation with the housing 60 by a snap ring 84, the inner periphery of the diaphragm is maintained in assembled relation with the nozzle member 74 by a snap ring 86. The nozzle member 74 constitutes a piston having a surface 88 exposed to the hydrostatic pressure created in the housing 60 during delivery stroke of the pump 26. This hydrostatic pressure will effect upward, or extending, movement of the nozzle member 74 relative to the stationary needle valve 68 and the stationary housing 60. Accordingly, the spray orifice 76 will be opened and liquid solvent will be directed onto the windshield. In addition, withdrawing of the stationary needle valve 68 will remove any foreign material from the spray orifice which originates externally or internally.

Figure 5:
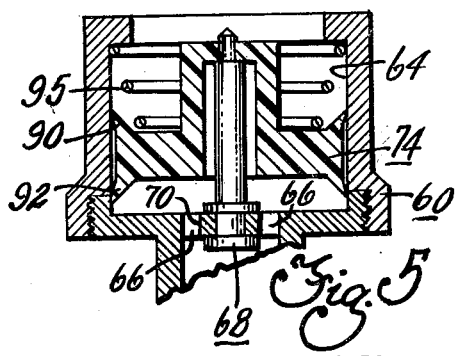
FIGURE 5 is an enlarged fragmentary sectional view of a nozzle constructed according to the third embodiment of the present invention in the rest position.

With reference to FIGURE 5, in the third modification the housing 60 and the needle valve 68 are identical to that described in connection with FIGURE 4. However, in this embodiment the diaphragm for closing the open end of the housing 60 is eliminated and the nozzle member 74 is formed with scraping edges 90 and 92 for removing any foreign material which might accumulate on the internal surface of the housing. In addition, to facilitate operation of the scrapers 90 and 92, a frusto conical return spring 95 is used to normally maintain the nozzle member 74 in the retracted position. Operation of the nozzle shown in FIGURE 5 is substantially the same as that described in connection with FIGURE 4, and in addition the scraping edges 90 and 92 coact with the surface of the bore 64 to remove accumulated foreign material therefrom during both extension and retraction.

With reference to FIGURES 6 and 7, in the fourth embodiment the nozzle member 94 is in the form of an elastomeric diaphragm which is inherently resilient and thus tends to return to the position shown in FIGURE 6 when the hydrostatic pressure is relieved. The diaphragm 94 has an external head 96 which is crimped in a flanged end 98 of the housing 100. In FIGURE 6, the diaphragm 94 has a molded spray orifice 102 through which a needle valve 104 extends. The needle valve 104 is attached to a transverse web 106 in the housing 100. In the modification shown in FIGURE 7, the elastomeric diaphragm 94 has a metal eyelet 108 attached thereto constituting the spray orifice.

Operation of the washer nozzle shown in FIGURES 6 and 7 is as follows. When the housing 100 is subjected to hydrostatic pressure, the diaphragm 94 is extended, or distended, upwardly relative to the stationary needle valve 104 and the housing 100. Accordingly, the spray orifice in the diaphragm is opened to permit the delivery of liquid solvent therethrough. Moreover, during relative movement between the diaphragm 94 and the needle valve 104 any foreign material which has accumulated in the spray orifice will be removed. When the hydrostatic pressure in the housing 100 is relieved, the diaphragm 94 will return to the position shown in FIGURES 6 and 7 due to its inherent resiliency, or natural recovery characteristic, whereupon the needle valve 104 will close the spray orifice.

With reference to FIGURE 8, in the fifth embodiment the nozzle member comprises a flexible annular elastomeric diaphragm 110, the outer edge of which is clamped between the housing 112 and a metal ring 114 by a plurality of rivets 116. The housing 112 includes a transverse web 118 to which the stationary needle valve 68 is attached. The diaphragm 110 has a central aperture 120 through which the needle valve 68 extends, and is bonded or otherwise suitably connected to an annular backing plate 122 having a spray orifice 124. The diaphragm 110 is normally retained in a retracted position, by return spring 126 wherein the spray orifice 124 is closed by the needle valve 68. The housing 112 includes a somewhat restricted opening 128 at its upper end through which the jet of liquid solvent is delivered.

Operation of the nozzle shown in FIGURE 8 is as follows. When the washer pump 26 is inactive, there is no hydrostatic pressure in the housing 112 and hence the spring 126 moves the diaphragm 110 to the retracted position wherein the backing plate 122 engages the shoulder 72 on the needle valve 68 so as to close the spray orifice 124. When the housing 112 is subjected to hydraulic pressure, the diaphragm 110 flexes upwardly, as viewed in FIGURE 8, relative to the stationary needle valve 68 so as to open the spray orifice 124. The relative movement between the needle valve 68 and the spray orifice 124 will remove any foreign material that has accumulated in the spray orifice.

From the foregoing it is readily apparent that the present invention provides means whereby the spray orifice is substantially enclosed when liquid solvent is not being delivered therethrough so as to prevent the accumulation of foreign material in the spray orifice. Moreover, in all of the embodiments the nozzle member is movable under the urge of hydrostatic pressure from a retracted position to an extending position during the delivery of liquid solvent to the nozzle housing. The relative movement between the nozzle member and the housing is used to automatically remove foreign material which might clog or plug the spray orifice of the nozzle member. Thus, all of the nozzle assemblies disclosed herein may be said to be self-cleaning under the action of hydrostatic pressure created by the washer pump during the delivery of liquid solvent to the nozzle assemblies.

While the embodiments of the invention as herein disclosed constitute preferred forms, it is to be understood that other forms might be adopted.

What is claimed is as follows:

1. A windshield washer nozzle including, a housing having an open end, a reciprocable piston disposed within said housing and dividing said housing into a spring chamber and a pressure chamber, said piston having an axially extending rod portion adapted to project through the open end of said housing, said rod portion having a spray orifice therein, said piston being movable relative to said housing under hydrostatic pressure to a position wherein the rod portion extends through the open end of said housing for directing a jet of liquid onto a windshield, spring means in said spring chamber operable to retract said piston when the hydrostatic pressure is relieved, and an elastomeric diaphragm enclosing the open end of said housing, the outer periphery of said diaphragm being secured to said housing and the inner periphery of said diaphragm being secured to the rod portion of said piston.

2. A windshield washer nozzle including, a housing having an open end, a reciprocable piston disposed within said housing and dividing said housing into a spring chamber and a pressure chamber, said piston having an axially extending rod portion adapted to project through the open end of said housing, said rod portion having a spray orifice therein, said piston being movable relative to said housing under hydrostatic pressure to a position wherein the rod portion extends through the open end of said housing for directing a jet of liquid onto a windshield, spring means in said spring chamber operable to retract said piston when the hydrostatic pressure is relieved, and a stationary needle valve attached to said housing and having a portion extending through and closing the spray orifice in said piston rod portion when said piston is retracted, said needle valve including a shoulder engageable with the piston rod portion and constituting a stop for determining the retracted position of said piston.

References Cited in the file of this patent
UNITED STATES PATENTS

| | | |
|---|---|---|
| 1,236,617 | Speakman | Aug. 14, 1917 |
| 2,017,467 | Loomis | Oct. 15, 1935 |
| 2,614,885 | Roell | Oct. 21, 1952 |
| 2,803,499 | Goyette | Aug. 20, 1957 |